May 24, 1960  R. E. RICHARDSON  2,937,407
METHOD OF MANUFACTURING CURVED, TINTED
LAMINATED GLASS INTERLAYERS
Filed June 26, 1956 2 Sheets-Sheet 1

RONALD E. RICHARDSON
BY Cushman, Darby & Cushman
ATTORNEYS

May 24, 1960  R. E. RICHARDSON  2,937,407
METHOD OF MANUFACTURING CURVED, TINTED
LAMINATED GLASS INTERLAYERS
Filed June 26, 1956  2 Sheets-Sheet 2

RONALD E. RICHARDSON

BY: *Cushman, Darby & Cushman*
ATTORNEYS

United States Patent Office 2,937,407
Patented May 24, 1960

2,937,407

METHOD OF MANUFACTURING CURVED, TINTED LAMINATED GLASS INTERLAYERS

Ronald E. Richardson, Oshawa, Ontario, Canada, assignor, by mesne assignments, to Pittsburgh Plate Glass Company, Pittsburgh, Pa.

Filed June 26, 1956, Ser. No. 594,047

Claims priority, application Canada Aug. 15, 1955

5 Claims. (Cl. 18—48)

This invention relates to improvements in certain preliminary steps involved in the manufacture of automobile windshields, or like panels of laminated safety glass of the type in which the synthetic resinous sheet employed as the interlayer is formed with a coloured edge strip (usually green) to provide the upper edge of the finished windshield with a tinted portion for the general improvement of visual conditions for the driver.

In modern automobiles, the windshield consists of a single sheet of laminated glass extending uninterruptedly across the body of the automobile and inclined backwardly at a substantial angle to the vertical. In many cases the windshield has sharply bent end portions projecting rearwardly and sometimes somewhat downwardly at each end, i.e. the so-called "wrap-around" type of windshield.

It is normally desirable that the tinted strip should extend generally horizontally along the top of the windshield. It may possibly be gently curved to follow the curvature of the upper edge of the glass, but such curvature would be slight and it is certainly not required that the lower edge of the tinted strip should follow a line equidistant from the upper edge of the glass at the bent-around ends thereof where such upper edge dips sharply downwards. This requirement that the tinted strip should follow a generally horizontal path when the windshield is mounted in its inclined position in an automobile, necessitates such strip being somewhat curved with its ends turned away from the glass when the windshield is laid flat, as it is during the various stages of its manufacture.

This manufacture has already become a standard procedure, consisting basically of an initial bending operation in which a pair of flat sheets of plate glass are bent to the required shape on a concave or convex mould while passing through an oven; an interlaying operation in which the sheets are temporarily separated to allow a sheet of plastic material (at the present time usually a polymerised vinyl derivative) to be placed therebetween; an initial pressing operation in which the composite sheet is passed between a pair of nipper rolls and the edges are trimmed; and a final high pressure stage in which such sheet is subjected to elevated pressure and temperature in an autoclave for the purpose of sealing the union between the laminations and finally curing the plastic material to render it transparent.

The interlaying operation is thus carried out after bending of the glass to the required shape. Each pair of glass sheets is moved on a roller conveyor to a position beneath a framework carrying a pair of suction cups. The framework is lowered, suction applied to grip the upper sheet of glass, and the framework then raised to lift such sheet. The sheet of plastic material to form the interlayer is then laid on the lower sheet of glass and carefully positioned. The upper sheet is then lowered into registration with the lower sheet and the suction released, the composite laminated sheet so formed then passing to the nipper rolls for the initial pressing operation.

Further appreciation of the problem leading up to the present invention will be assisted by reference to the accompanying drawings. In these drawings.

Other figures of the drawings will be described below.

Figure 1:
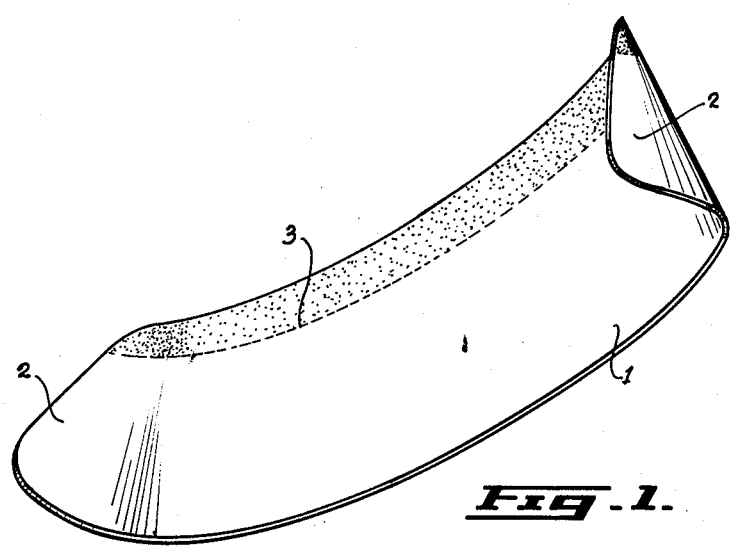
Figure 1 shows a perspective view of a typical "wrap-around" type windshield.
Figure 2:
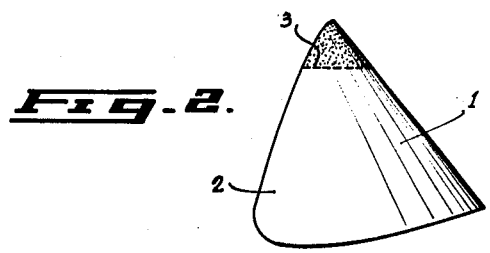
Figure 2 shows an end view of the same windshield.
Figure 3:
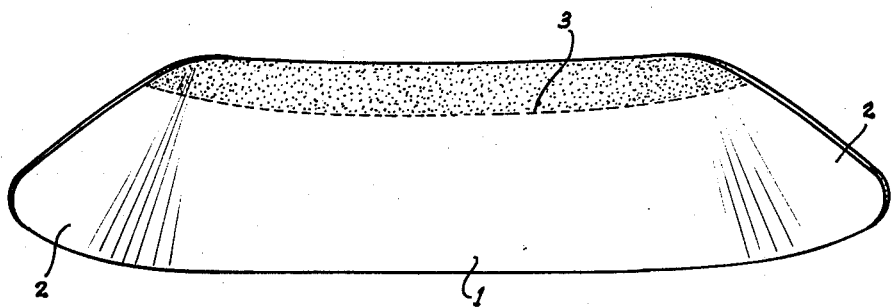
Figure 3 shows a plan view of the same windshield, i.e. as seen in a direction normal to a supporting surface on which the windshield would rest on its convex surface.

As appears from Figures 1 to 3, the windshield consists of a gently curved central portion 1 terminating at each end in a comparatively sharply bent portion 2. It is desired that the lower edge (known as the blend line) of the tinted strip should follow the horizontal line 3 shown in Figure 2, which figure shows the windshield, in relation to the horizontal and vertical directions, substantially as it will be mounted in an automobile. When this windshield is laid on its convex surface, the blend line 3 will appear as shown in Figure 3, i.e. somewhat curved, particularly at the ends.

As a practical matter it is most undesirable to have to fabricate individually each piece of vinyl sheeting to be used as an interlayer in such windshields. Normally this material is supplied by the manufacturer in long lengths, a strip of four or five inches in width along one edge being treated with the tinting dye. These lengths are wound for shipment, to be unwound again at the plant manufacturing the windshields and there cut into the required short lengths for use. If the blend line of the dyed strip of each of these short lengths of sheeting is then to be made to conform to the line 3, it will be necessary for the remainder of the material, i.e. the undyed strip, to be stretched somewhat when the sheeting is placed between the glass during the interlaying operation, or else for the dyed strip to be compressed which would introduce the danger of buckling of the sheet along the dyed edge. Such manipulation of the sheet during the interlaying operation would change the latter from a comparatively simple routine procedure to a precision operation.

It is thus an object of the present invention to provide prestretched plastic sheeting for use as an interlaying sheet in the manufacture of tinted laminataed windshields.

It would of course be possible to cut each sheet to the required length from the roll and then mount such sheet on a frame which is subsequently ununiformly expanded. Not only would this process involve the use of a large number of frames in order to be able to stretch sufficient sheets for the required time, but the nature of the vinyl sheeting now almost universally used for laminated safety glass, is such that the tension must remain applied for some considerable time if the elastic memory of the material is not to reverse the stretching process.

The present invention consists of a method of manufacturing individual elongated interlayers of synthetic resinous material for use in the manufacture of strip-tinted laminated automobile windshields, said method comprising taking a continuous elongated sheet of said material having mutually parallel lateral edges and a dyed strip of uniform width extending longitudinally along one such lateral edge with the blend line of said strip extending parallel with said edges; longitudinally permanently stretching said sheet while still in continuous uncut form, the degree of said longitudinal stretching being greatest at the lateral edge remote from said dyed strip and decreasing linearly in the transverse direction of the sheet to be least at the lateral edge adjacent said dyed strip; and, subsequent to said stretching step, cutting said sheet transversely into individual elongated interlayers, each said interlayer having the blend line of the dyed strip curved convexly towards the undyed portion of said interlayer.

According to the preferred form of the present invention, a long length of synthetic resinous sheeting provided with a dyed edge strip is so wound prior to use that the undyed portion is stretched relatively to the dyed portion. Conveniently this simultaneous winding and stretching may be obtained by the use of a conical mandrel, either a solid conical mandrel onto which the sheet is wound directly, or an expansible mandrel that is cylindrical when the winding operation takes place and is subsequently expanded to conical or like tapered form. When the former method is adopted it is essential to stretch the material as it is being wound onto the mandrel in order to avoid the inherent difficulty of winding an elongated sheet onto a conical surface. The latter method automatically avoids this difficulty.

As an alternative to the use of a conical mandrel, the sheet may be wound onto a cylindrical mandrel with an interposed paper strip of approximately half the width of the sheet, this paper strip being wound with the sheet on the undyed side thereof. In the same manner as before a conical effect is produced and the undyed side of the sheet is stretched as the winding operation proceeds. The quantitative degree of this stretching is not very great, but should be sufficient to provide the necessary curvature of the tinted edge when the sheet is again laid flat, after compensating for the tendency that such sheets dyed along one edge have to wind in a slight cone with the dyed edge having the greater diameter. This tendency, which is the reverse of the effect required, results from the very slightly increased thickness of the dyed strip due to the presence of the dye.

Figure 4:
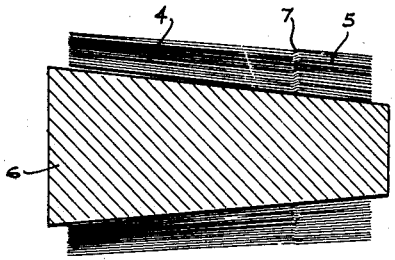
Figure 5:
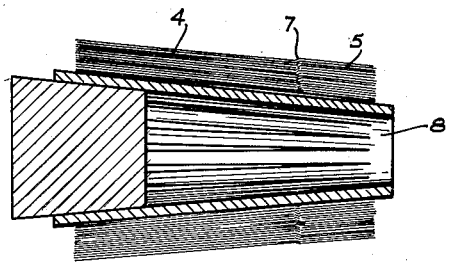

These methods of winding the sheet are illustrated diagrammatically in Figures 4 and 5 of the accompanying drawings, in which:

Figure 4 shows the method applied to a simple conical mandrel; and

Figure 5 shows the method applied to an expansible mandrel.

In Figure 4, an elongated vinyl sheet 4 having mutually parallel lateral edges and a dyed edge strip 5 of uniform width extending along one edge of the sheet is wound onto a conical mandrel 6. The blend line of the dyed edge strip 5 extends parallel with said edges. The slight enlargement produced by the greater thickness of the strip 5 is diagrammatically illustrated by a step 7, the magnitude of this step being somewhat exaggerated in the drawing for ease of illustration. This enlargement nevertheless represents a smaller stretching effect than that produced on the undyed portion of the sheet, which is wound around the larger end of the mandrel.

The method illustrated in Figure 5 is similar except that an expansible mandrel 8 is employed and the stretching thus takes place after winding.

It will be evident that by either of these manners of forming a conical roll, the continuous sheet has been stretched with the greatest degree of stretching at the lateral edge remote from the dyed strip and the least degree of stretching at the lateral edge adjacent said dyed strip (which least degree may be zero). The longitudinal stretching between said edges decreases linearly in the transverse direction of the sheet from one edge to the other.

It is envisaged that the stretching operation conducted in accordance with the present invention may be carried out after completion of manufacture of the sheeting, e.g. by the windshield manufacturer. This would necessitate rewinding of the sheeting by the windshield manufacturer from the conventionally cylindrically wound rolls supplied by the sheeting manufacturer into rolls in accordance with the present invention. Alternatively, the stretch could be imparted to the sheeting before the final stage in its manufacture which is a curing operation. The sheeting would then be wound by the manufacturer in one of the manners provided for by the present invention before such curing operation and would be shipped to the windshield manufacturer's plant in this form.

By way of a specific example, it may be stated that the invention has successfully been carried into practice in the following manner.

The starting material was a roll of a plasticized polyvinyl acetal (the particular plastic employed being plasticized polyvinyl butyral), such material having been previously treated to provide a longitudinally extending, transversely graduated coloured strip along one edge in the manner previously described. The surface of the material had a thin deposit of soda in the usual manner in order to prevent adhesion of contacting surfaces in the rolled condition. A quantity of this material was wrapped around a 12" diameter mandrel until a cylinder about 1" thick had been built up. This required between 200 to 250 feet of sheeting. Winding of the vinyl sheeting onto the mandrel was carried out in the plastic cutting room where the atmosphere is carefully controlled to maintain a temperature of approximately 65° F. and a relative humidity between 24 and 30%.

The mandrel with the plastic sheeting wrapped therearound was then placed in an oven maintained at about 180° F. It was not found necessary to make a special attempt to control the humidity in the oven because in practice at this temperature the air has a sufficiently low relative humidity to avoid sticking of contacting surfaces of the material. The mandrel with the sheeting wound around it was kept in the oven for a period of about an hour in order to insure that all the material reached oven temperature. This temperature, which may vary from the 180° F. employed in the particular example, will be chosen in the light of the characteristics of the plastic material employed, and will be sufficiently high to ensure that the material may be stretched without offering too large a resistance or being likely to tear, while at the same time not being high enough to weaken the material unduly or cause it to stick together.

The mandrel was then removed from the oven and immediately expanded at one end to form a truncated cone. This operation was carried out at room temperature and it was not found necessary to maintain special control of the temperature or humidity. The stretching of the sheeting took place slowly with the whole operation occupying rather less than five minutes. The amount of increase in diameter of the end of the mandrel, which, of course, was that end of the mandrel not occupied by the tinted strip is proportional to the radius of curvature to be imparted to the tinted strip in the final product. To obtain a radius of curvature for the edge of the tinted strip of about 11 feet, which is of the order of magnitude called for by existing windshield design, the diameter of the mandrel at the expanded end was increased from 12" to 16".

The assembly, now conical in shape, was then replaced in the oven where it remained for a sufficient length of time to remove the stresses in the material brought about by the stretching and to equalize the temperature throughout the material. One further hour in the oven was found to be ample time for these purposes.

The assembly was then again removed from the oven and stored in the plastic cutting room under the temperature and humidity conditions mentioned above for a period of about an hour and a half, to insure complete cooling of all the material. To accelerate cooling air may be moved across the assembly by means of a fan. The plastic sheeting is then unwound from the mandrel and festooned on a table whereupon it can immediately be cut up into portions to form individual interlayers for use in curved windshields. Alternatively the material may be stored until required.

After cutting these interlayers are subjected to the conventional steps of washing (to remove the soda) and drying, before passing into the assembly room where they are placed between a pair of glass sheets. In this connection there may be mentioned a further advantage of the invention that has been discovered in practice. At the end of the washing stage it is usual to pass the plastic material between at least one pair of squeezing rolls to remove excess moisture prior to a hot air drying stage. With sheets of plastic material that had been stretched by the prior method of stretching employed, namely each already cut sheet stretched individually on a frame, a certain degree of pucker was often present in the material due to lack of uniformity of stretching, and this pucker gave rise to the formation of creases in the material during passage through such squeezing rolls. The more uniform stretching obtained by the method of the present invention has been found greatly to reduce this tendency.

I claim:

1. A method of manufacturing individual elongated interlayers of synthetic resinous material for use in the manufacture of strip-tinted laminated automobile windshields, said method comprising taking a continuous elongated sheet of said material having mutually parallel lateral edges and a dyed strip of uniform width extending longitudinally along one such lateral edge with the blend line of said strip extending parallel with said edges; longitudinally permanently stretching said sheet while still in continuous uncut form, the degree of said longitudinal stretching being greatest at the lateral edge remote from said dyed strip and decreasing linearly in the transverse direction of the sheet to be least at the lateral edge adjacent said dyed strip; and, subsequent to said stretching step, cutting said sheet transversely into individual elongated interlayers, each said interlayer having the blend line of the dyed strip curved convexly towards the undyed portion of said interlayer.

2. A method of manufacturing individual elongated interlayers of synthetic resinous material for use in the manufacture of strip-tinted laminated automobile windshields, said method comprising taking a continuous elongated sheet of said material having mutually parallel lateral edges and a dyed strip of uniform width extending longitudinally along one such lateral edge with the blend line of said strip extending parallel with said edges; longitudinally permanently stretching each successive area of said sheet while still in continuous uncut form by distorting each successive area of said sheet into conically curved configuration, the degree of said longitudinal stretching being greatest at the lateral edge remote from said dyed strip and decreasing linearly in the transverse direction of the sheet to be least at the lateral edge adjacent said dyed strip; and, subsequent to said stretching step, cutting said sheet transversely into individual elongated interlayers, each said interlayer having the blend line of the dyed strip curved convexly towards the undyed portion of said interlayer.

3. A method of manufacturing individual elongated interlayers of synthetic resinous material for use in the manufacture of strip-tinted laminated automobile windshields, said method comprising taking a continuous elongated sheet of said material having mutually parallel lateral edges and a dyed strip of uniform width extending longitudinally along one such lateral edge with the blend line of said strip extending parallel with said edges; forming said elongated sheet into a conical roll comprising a plurality of superposed convolutions of said sheet with the undyed portion of said sheet at the end of said roll of greater diameter, each said convolution tapering uniformly from one end to the other of said roll, whereby to subject said sheet to longitudinal stretching, the degree of said longitudinal stretching being greatest at the lateral edge remote from said dyed strip and decreasing linearly in the transverse direction of the sheet to be least at the lateral edge adjacent said dyed strip; heating said roll to remove stresses while maintaining said stretching; subsequently cooling said roll while maintaining said stretching; unrolling the stretched sheet; and finally cutting said sheet transversely into individual elongated interlayers, each said interlayer having the blend line of the dyed strip curved convexly towards the undyed portion of said interlayer.

4. A method of manufacturing individual elongated interlayers of synthetic resinous material for use in the manufacture of strip-tinted laminated automobile windshields, said method comprising taking a continuous elongated sheet of said material having mutually parallel lateral edges and a dyed strip of uniform width extending longitudinally along one such lateral edge with the blend line of said strip extending parallel with said edges; winding said elongated sheet into a cylindrical roll comprising a plurality of superposed convolutions of said sheet; expanding said cylindrical roll into a conical roll with the undyed portion of said sheet at the end of the conical roll of greater diameter, each said convolution tapering uniformly from one end to the other of said conical roll, whereby to subject said sheet to longitudinal stretching, the degree of said longitudinal stretching being greatest at the lateral edge remote from said dyed strip and decreasing linearly in the transverse direction of the sheet to be least at the lateral edge adjacent said dyed strip; heating the conical roll to remove stresses while maintaining said stretching; subsequently cooling said conical roll while maintaining said stretching; unrolling the stretched sheet; and finally cutting said sheet transversely into individual elongated interlayers, each said interlayer having the blend line of the dyed strip curved convexly towards the undyed portion of said interlayer.

5. A method according to claim 4, including the step of heating said roll during the step of expanding said cylindrical roll to said conical roll.

References Cited in the file of this patent

UNITED STATES PATENTS

| | | |
|---|---|---|
| 2,250,430 | Wade | July 22, 1941 |
| 2,700,007 | Dennison et al. | Jan. 18, 1955 |